(12) United States Patent
Isbitsky

(10) Patent No.: US 6,959,908 B2
(45) Date of Patent: Nov. 1, 2005

(54) GATE VALVE FLEXIBLE WEDGE

(75) Inventor: Alexander Stanley Isbitsky, Montréal (CA)

(73) Assignee: Velan Inc., St-Laurent (CA)

( * ) Notice: Subject to any disclaimer, the term of this patent is extended or adjusted under 35 U.S.C. 154(b) by 0 days.

(21) Appl. No.: 10/452,507

(22) Filed: Jun. 3, 2003

(65) Prior Publication Data

US 2004/0245488 A1 Dec. 9, 2004

(51) Int. Cl.[7] ............................................. F16K 25/00
(52) U.S. Cl. ...................................... 251/85; 251/327
(58) Field of Search ........................... 251/85, 84, 327, 251/326, 195, 193

(56) References Cited

U.S. PATENT DOCUMENTS

| | | | | |
|---|---|---|---|---|
| 2,948,503 A | * | 8/1960 | Williams ..................... | 251/85 |
| 3,815,868 A | * | 6/1974 | Bobo et al. ................... | 251/86 |
| 3,837,617 A | * | 9/1974 | Eminger et al. .............. | 251/87 |
| 3,993,285 A | * | 11/1976 | Conley ........................ | 251/86 |
| 5,657,961 A | * | 8/1997 | Kalsi et al. .................. | 251/324 |
| 5,722,636 A | * | 3/1998 | Houston ...................... | 251/167 |
| 6,338,469 B1 | * | 1/2002 | Kalsi et al. .................. | 251/327 |

FOREIGN PATENT DOCUMENTS

DE    1 040 861    * 10/1958

* cited by examiner

*Primary Examiner*—John Bastianelli
(74) *Attorney, Agent, or Firm*—Ogilvy Renault LLP

(57) ABSTRACT

A flexible wedge has a pair of pressure retaining plates and a central wedge body therebetween. The pressure retaining plates have inclined seating surfaces on opposed outer faces thereof for mating with corresponding valve seats within the valve body to prevent substance flow therethrough when the gate valve wedge is in the closed position. The central wedge body is disposed between, and integrally links, the pressure retaining plates. The central wedge body defines at least two offset slots which extend partially into the central wedge body from opposed edges thereof and which overlap in a depth-wise direction to define a deflectable web portion between the offset slots.

22 Claims, 7 Drawing Sheets

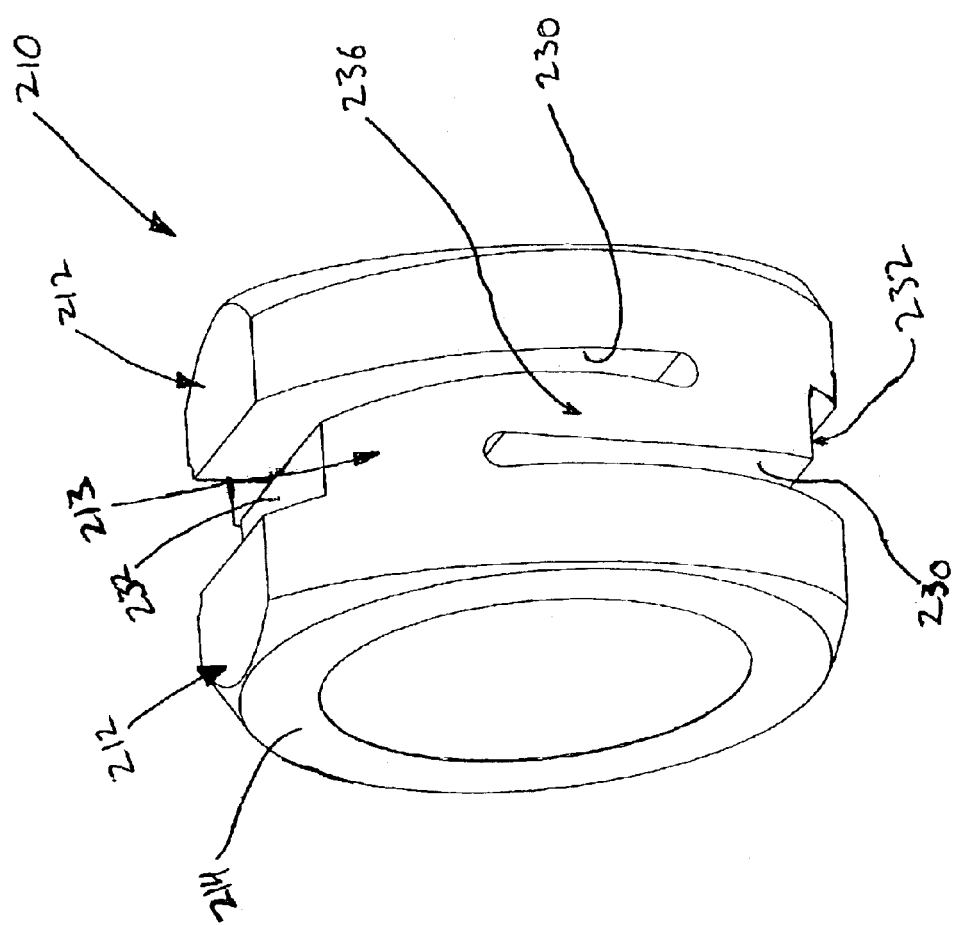

US 6,959,908 B2

GATE VALVE FLEXIBLE WEDGE

TECHNICAL FIELD

The present invention relates generally to wedge gate valves and more particularly to a flexible wedge for a gate valve.

BACKGROUND OF THE INVENTION

Gate valves are well known and are regularly employed in various industrial and commercial applications. Generally, a gate valve is a valve in which the throttling body, namely the gate or wedge, moves in a linear direction perpendicularly across the substance flow through the valve body. Many critical applications require the valve to reliably operate and provide efficient sealing at high temperatures and under conditions of high pressure and high fluid flow.

It is accordingly known to employ gate valves having flexible wedges for such critical applications. Flexible wedges generally provide a better seal than traditional solid gate valve wedges, as seat face distortions caused by changes in pressure, temperature and external forces can be more easily accommodated by the flexibility of the valve wedge. Flexible wedges also generally reduce pinching and thermal binding of the valve wedge within the seats, which can occur due to large changes in temperature and pressure.

While thermal and pressure induced binding of flexible gate valve wedges occurs less than with solid wedge designs, known flexible wedges have not completely prevented these problems in extreme conditions. Further, the inherent flexibility of known flexible wedges is restricted by their structure, and therefore the amount of seating face distortion which can be accommodated by the gate valve wedge without a loss of sealing ability is limited.

U.S. Pat. Nos. 5,657,961 and 6,338,469, issue respectively Aug. 19, 1997 and Jan. 15, 2002 to Kalsi et al., both describe a flexible wedge gate valve which attempts to overcome these problems. The flexible wedge disclosed comprises a center portion having an internal transverse cavity extending therethrough, which defines flexible walls on both sides thereof. Upstream and downstream pressure boundary plates are integrally connected to the center portion by smaller diameter cylindrical hub sections. Circumferentially extending slots are therefore effectively defined between the upstream and downstream pressure boundary plates and the center disk portion. Accordingly, flexibility of the wedge taught by Kalsi et al. is provided by the transversely extending through cavity and by the outer circumferential grooves. While this structure provides some degree of flexibility, it is achieved by three dimensional bending of the pressure boundary plates around the central disk hub and flexure of the walls surrounding the central cavity, which limits the amount of deflection possible relative to other bending mechanisms which are intrinsically less stiff. The flexibility of the structure disclosed by Kalsi et al. could be increased by making the pressure boundary plates thinner, by reducing the diameter of the of the central disk hub or by making the walls of the central cavity thinner, however these modifications will reduce the strength of the wedge. Further, the deflection of the pressure boundary plates by three dimensional bending causes the seating surfaces thereon to distort, thereby reducing the sealing ability of the gate valve wedge.

Accordingly, there remains a need for an improved flexible gate valve wedge having greater flexibility than known flexible wedges, thereby conferring greater resistance to thermal and pressure induced binding, without sacrificing strength or sealing ability of the gate valve wedge.

SUMMARY OF THE INVENTION

It is an object of the present invention to provide a gate valve wedge having improved flexibility.

It is another object of the present invention to provide a flexible wedge, for use in a gate valve, in which stress and deformation of the wedge blades having the seating surfaces thereon are limited.

Therefore, in accordance with the present invention, there is provided a flexible wedge for a gate valve, adapted for being linearly displaced by a valve stem along a longitudinal stem axis within a gate valve body, the flexible wedge being displaceable between an open position and a closed position, said flexible wedge comprising: a pair of pressure retaining plates having inclined seating surfaces on outer faces thereof for mating with corresponding valve seats within said valve body to prevent fluid flow therethrough when said gate valve wedge is in said closed position; and a central wedge body disposed between and linking said pressure retaining plates, said central wedge body defining two offset slots extending partially into said central wedge body from opposed edges thereof and overlapping in a depth-wise direction to define a deflectable web portion between said offset slots, said slots being asymmetrical relative to a transversely extending plane bisecting the flexible wedge and defining said longitudinal stem axis therein.

There is also provided, in accordance with the present invention, a gate valve comprising: a valve body defining a fluid flow passage therethrough and a valve wedge chamber, said valve body having inclined annular valve seats at an intersection of said fluid flow passage and said valve wedge chamber; a flexible wedge gate comprising upstream and downstream pressure retaining plates each having an inclined seating surface on an outer face thereof, said wedge gate being disposed within said valve body for closing said fluid flow passage and being linearly displaceable along a first axis within said valve wedge chamber between an open position and a closed position wherein said seating surfaces mate with said annular valve seats of said valve body to form a seal therebetween preventing fluid flow through said valve body; said wedge gate having a central wedge body disposed between and linking said upstream and downstream pressure retaining plates, said central wedge body defining two offset slots extending partially into said central wedge body from opposed edges thereof and overlapping in a depth-wise direction to define a deflectable web position between said offset slots, said slots being asymmetrical relative to a central transversely extending plane bisecting the wedge gate and defining said first axis therein; and a valve stem engaged at a first end thereof to said valve wedge and extending outwardly from said valve body, said valve stem being actuable to linearly displace said wedge gate along said first axis between said open position and said closed position.

There is further provided in accordance with the present invention a flexible wedge for a gate valve, adapted for being linearly displaced by a valve stem along a longitudinal stem axis within a gate valve body, the flexible wedge being displaceable between an open position and a closed position, said flexible wedge comprising: a pair of pressure retaining plates having inclined seating surfaces on outer faces thereof for mating with corresponding valve seats within said valve body to prevent fluid flow therethrough when said gate valve wedge is in said closed postion; and a central wedge body disposed between and linking said pressure retaining plates, said central wedge body defining at least two offset slots extending partially into said central wedge body from opposed edges thereof and overlapping in a depth-wise direction to define a deflectable web portion between said offset slots, said slots being parallel to each other and to a transversely extending plane bisecting the flexible wedge and defining said longitudinal stem axis therein.

There is further provided in accordance with the present invention a flexible wedge for a gate valve, adapted for being linearly displaced by a valve stem along a longitudinal stem axis within a gate valve body, the flexible wedge being displaceable between an open position and a closed position, said flexible comprising: a pair of pressure retaining plates having inclined seating surfaces on outer faces thereof for mating with corresponding valve seats within said valve body to prevent fluid flow therethrough when said gate valve wedge is in said closed position, and a central wedge body disposed between and linking said pressure retaining plates, said central wedge body defining two offset slots extending only partially into said central wedge body in a lateral direction from opposed lateral edges thereof and overlapping in a depth-wise direction to define a deflectable web portion between said offset slots, said offset slots extending completely through said central wedge body in an axial direction substantially parallel to said longitudinal stem axis and substantially normal to said lateral direction.

BRIEF DESCRIPTION OF THE DRAWINGS

Further features and advantages of the present invention will become apparent from the following detailed description, taken in combination with the appended drawings, in which:

FIG. 3b is a side elevation view of the flexible wedge of FIG. 3a;

FIG. 3c is a top plan view of the flexible wedge of FIG. 3a;

FIG. 4b is a side elevation view of the flexible wedge of FIG. 4a;

FIG. 4c is a top plan view of the flexible wedge of FIG. 4a; and

FIG. 5 is a perspective view of a flexible wedge for a gate valve in accordance with a third embodiment of the present invention.

DETAILED DESCRIPTION OF THE PREFERRED EMBODIMENT

Figure 1:
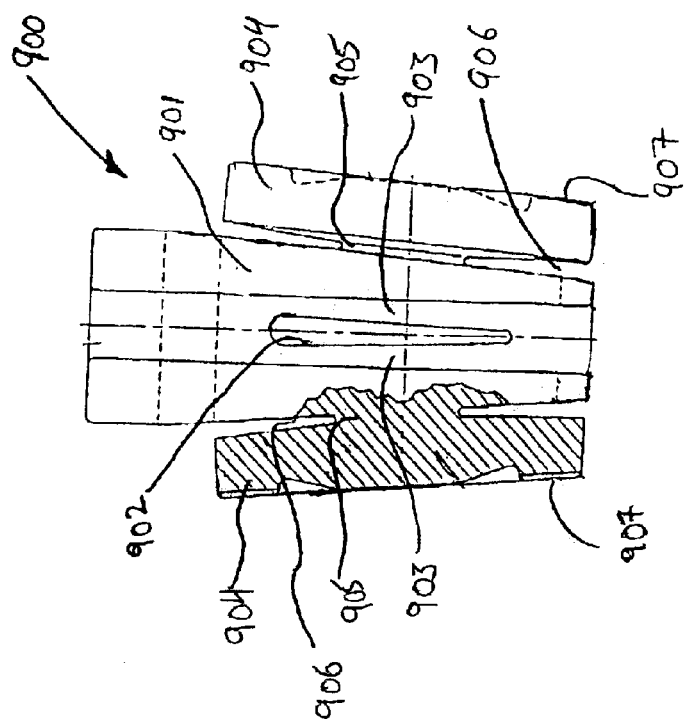
FIG. 1 is a partially sectioned side elevation view of a flexible gate valve wedge of the prior art.

A flexible gate valve wedge 900 of the prior art is depicted in FIG. 1, generally having a center portion 901 comprising an internal transverse cavity 902 extending therethrough and defining flexible walls 903 on both sides thereof. Pressure boundary plates 904 are integrally engaged with the center portion 901 by central cylindrical hubs 905 having smaller diameters than said pressure boundary plates 904, thereby defining circumferential slots 906 therebetween. The pressure boundary plates therefore are capable of bending in three dimensions around the central cylindrical hubs 905, providing some degree of flexibility. However, this can cause the seating surfaces 907 on the faces of the pressure boundary plates 904 to distort when they are exposed to seat contact stress.

Figure 2:
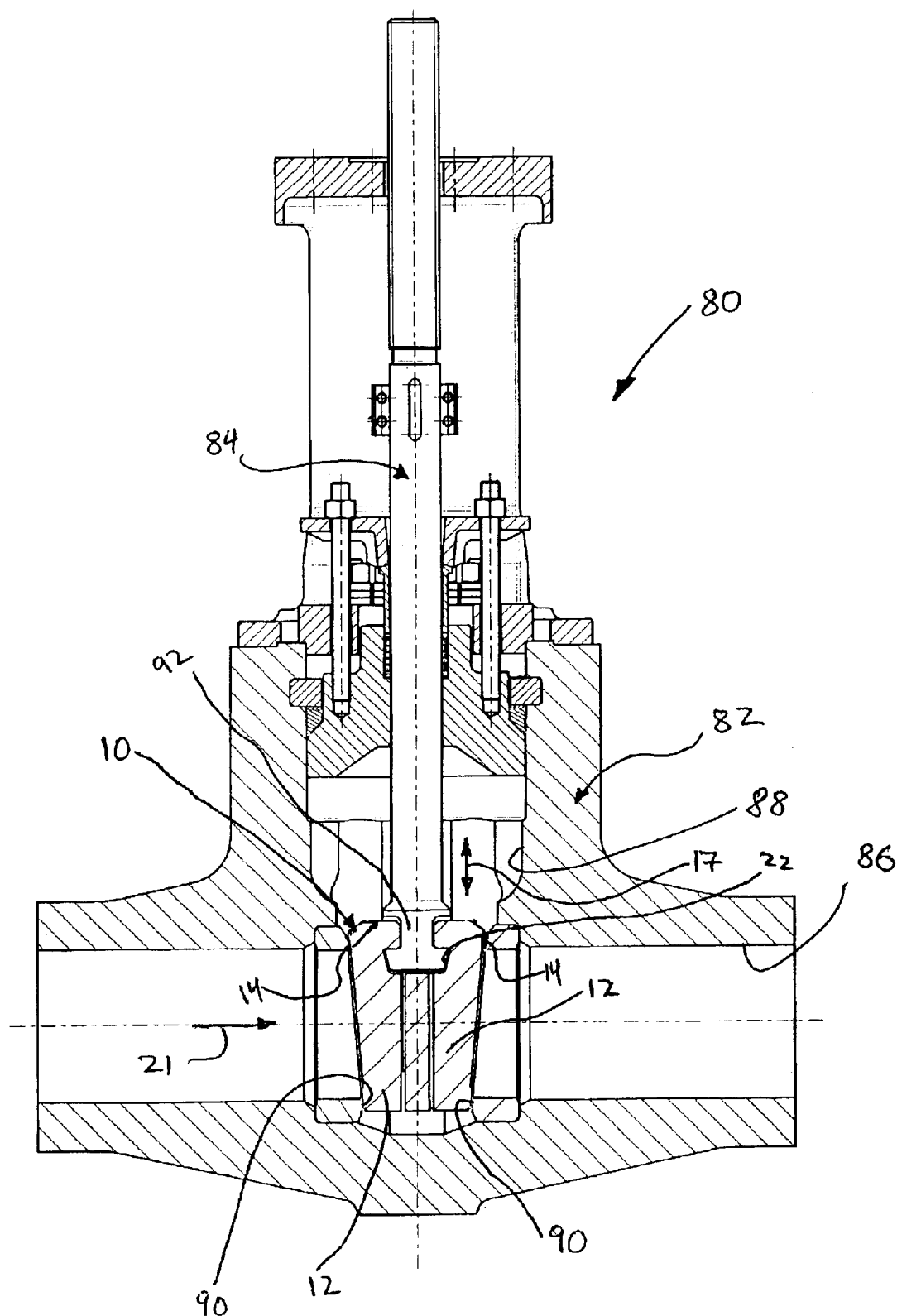
FIG. 2 is a cross-sectional view of a gate valve having a flexible wedge in accordance with a first embodiment of the present invention.

Referring to FIG. 2, a gate valve 80 in accordance with the present invention comprises generally a valve body 82, a valve stem 84 and a flexible wedge 10. The valve body 82 defines therein an axial fluid flow passage 86 and a generally radially extending valve wedge chamber 88 which intersect one another. The valve body further includes annular valve seats 90 at the intersection of the fluid flow passage 86 and the valve wedge chamber 88. The flexible wedge 10 comprises a pair of pressure retaining plates 12 having annular inclined seating surfaces 14 on upstream and downstream faces thereof, which mate with the corresponding valve seats 90 to form a seal therebetween when the flexible wedge 10 is in a closed valve position, thereby preventing fluid flow through the fluid flow passage 86 of the valve body 82. The flexible wedge 10 is linearly translatable in a wedge travel direction 17 perpendicular to a direction of fluid flow 21 through the fluid flow passage 86. The flexible wedge 10 is displaceable between an open position and a closed position within the valve body 82, and particularly within the valve wedge chamber 88, by the valve stem 84, which is engaged to an outer end of the flexible wedge 10 at an inner end 92 thereof. The valve stem can be actuated, manually or by a motor for example, to displace the flexible wedge 10 between the open and closed positions. The inner end 92 of the valve stem 84 engages within the T-shaped stem slot 22 of the flexible wedge 10, extending transversely across the upper portion of the flexible wedge 10.

Figure 3A:
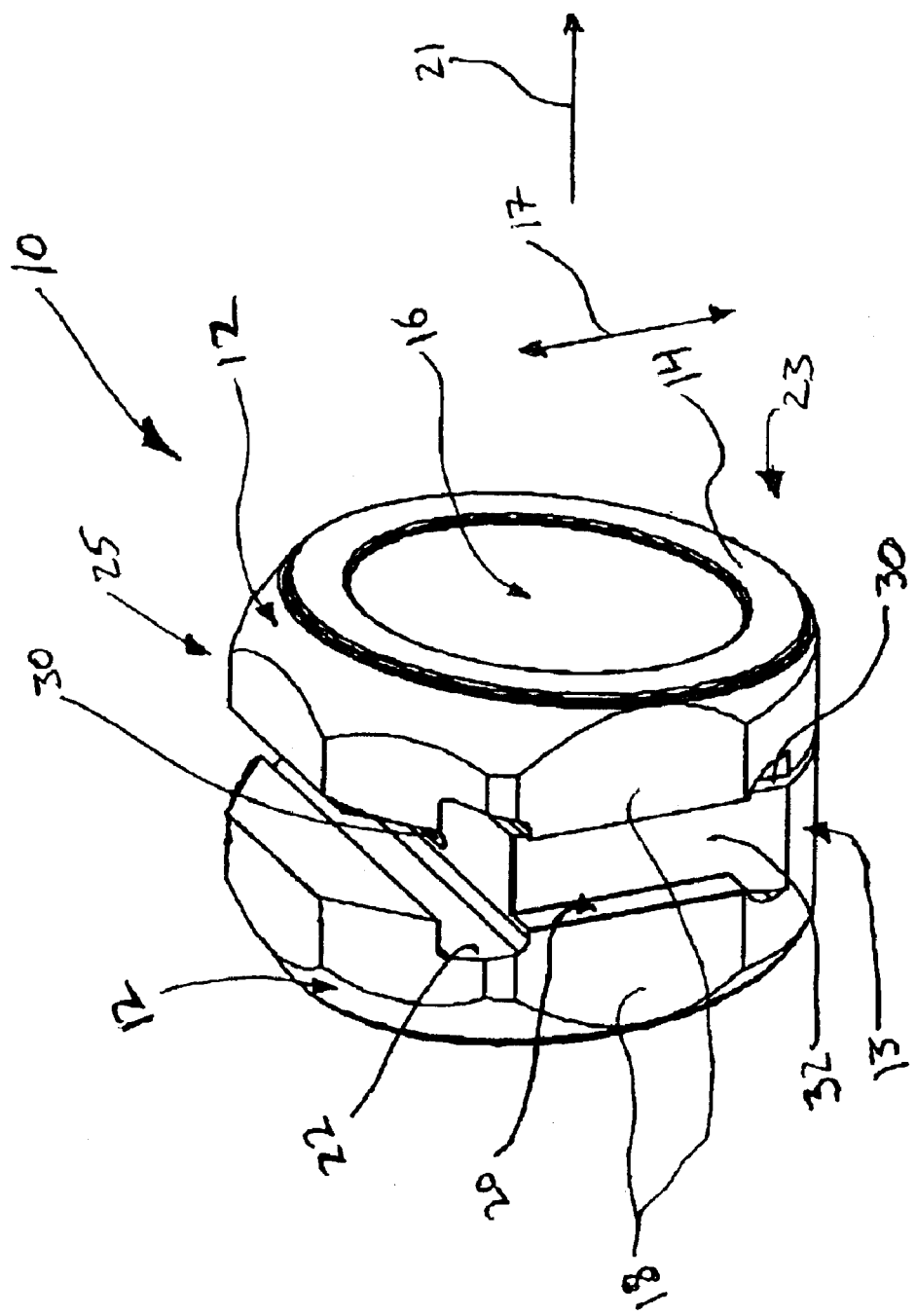
FIG. 3a is a perspective view of the flexible wedge of FIG. 2.
Figure 3C:
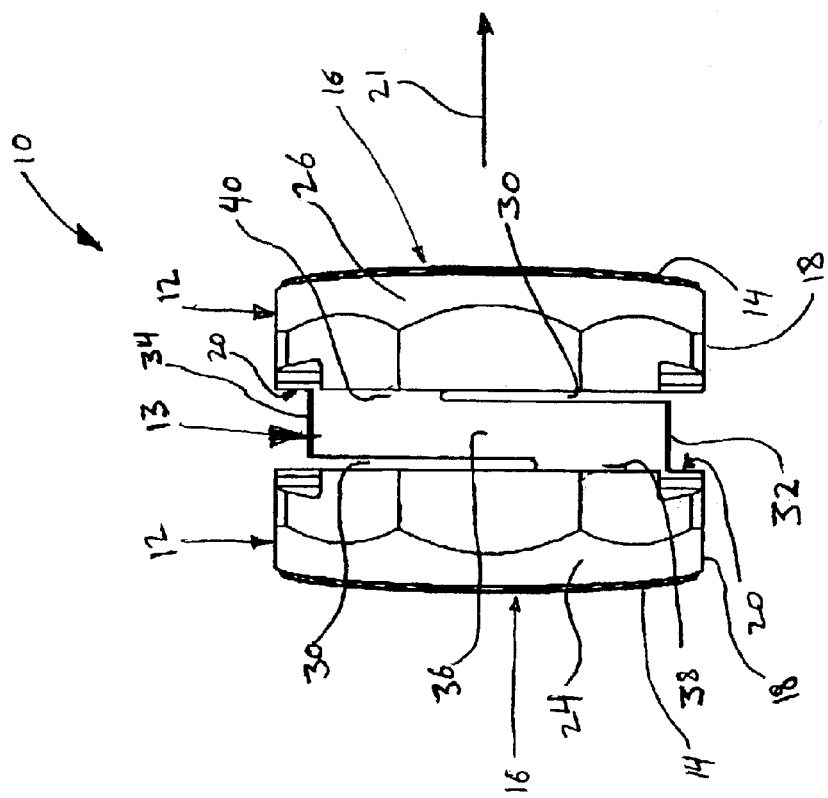
Figure 3B:
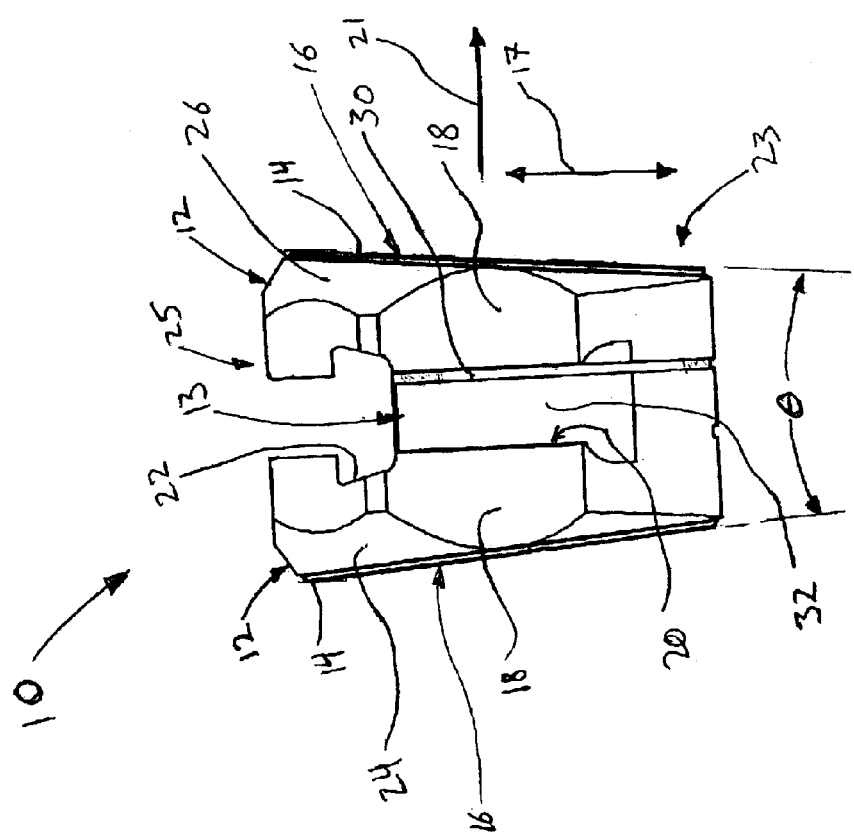

Referring to FIGS. 3a to 3c which show the flexible wedge 10, a first embodiment of the present invention, in greater detail, the flexible wedge 10 comprises generally a pair of generally circular pressure retaining plates 12, particularly an upstream pressure retaining plate 24 and a downstream pressure retaining plate 26, which are integrally linked by a central wedge body 13 therebetween. The pressure retaining plates, or blades, 12 comprise outer faces 16 which block fluid flow through the valve body when the gate valve flexible wedge 10 is in the closed position within the valve body. When the flexible wedge 10 is in the closed position, the annular seating faces 14 on the pressure retaining plates 12 are pressed into sealing engagement with corresponding planar valve seats within the valve body. The seating surfaces 14 of the flexible wedge 10 are inclined such that they are convergent at an inner end 23 of the gate valve flexible wedge 10, as best seen in FIG. 2b, thereby defining a wedge angle θ between the two seating surfaces 14. The mating valve seats in the valve body are cooperatively inclined and outwardly divergent. Accordingly, a relatively narrow angled wedge is provided such that the vertical stem force applied to an outer end 25 of the flexible wedge 10 is converted into a larger normal force at the seating faces. This provides a tight seal between the seating surfaces 14 of the pressure retaining plates 12 and the corresponding valve seats of the valve body, regardless of the differential pressure across the flexible wedge 10.

The transverse faces 18 located on opposite lateral sides of the flexible wedge 10 each comprise a vertically extending guide slot 20 defined therein for engagement with correspondingly shaped guide rails in the valve body. The guide slots 20 maintain the flexible wedge 10 in an upright position as it is linearly displaced by the valve stem between the closed and open positions within the valve body. The transverse faces and sidewalls of the guide slots 20 thereby position the flexible wedge 10 within the wedge travel aperture of the valve body, such that substantially only linear displacement of the flexible wedge 10 in the wedge travel direction 17 is possible.

The central wedge body 13 of the flexible wedge 10 comprises at least two parallel offset slots 30, each extending partially into the central wedge body 13 from one of opposed lateral faces 32 and 34 thereof, and being substantially perpendicular to the fluid flow direction 21. The offset slots 30 overlap in a depth-wise direction such that a deflectable web portion 36 is defined in the central wedge body 13, between the two offset slots 30. The two offset slots 30 vertically extend completely through the central wedge body 13, and transversely extend therein an equal depth. However, it is to be understood each of the two offset slots 30 can have a depth which is different from that of the opposed slot, and further that each can have non-constant depth. Additionally, the number and width of the offset slots 30 can be varied, in order to control the stiffness of the flexible wedge 10. Although the offset slots 30 depicted are planar and parallel, the cross-sectional profile of the slots can also be curved, key-shaped, scroll-shaped or can define a D-shaped cross-section, and accordingly need not necessarily be parallel to one another. While these varied profiles are listed as examples, it is to be understood that similar offset slots having other profiles can also be provided. The number, depth, width and profile of the slots 30 in the central wedge body 13, can therefore be varied to provide a desired level of stiffness for the flexible wedge 10.

For example, FIG. 5 depicts a flexible wedge 210 in accordance with a third embodiment of the present invention, having offset slots 230 defining a curved profile. The curved offset slots 230 nevertheless partially extend from opposed upper and lower edges 232 into the central wedge body 213 which links the pressure retaining plates 212, having annular seating surfaces 214, disposed on either side thereof. The curved offset slots 230 extend partially therein and overlap in a depth-wise direction to define the curved deflectable web portion 236 therebetween.

Referring back to FIGS. 3a to 3c, the offset and overlapping slots 30 create a "folded topology" in the central wedge body 13, which provides a greater flexibility for the flexible wedge 10 than those of the prior art. Particularly, deflectable web portion 36 is therefore only engaged to the upstream pressure retaining plate 24 at a first lateral end 38 thereof and to the downstream pressure retaining plate 26 at a second opposed lateral end 40. While the deflectable web portion 36 is integrally engaged at opposed ends thereof the one of the upstream and downstream pressure retaining plates 24 and 26, it is to be understood that the deflectable web portion 36 can also be a discrete element, such as a flat strip for example, fixed to the pressure retaining plates by a suitable permanent means.

The offset slots 30 which extend vertically completely through the central wedge body 13, accordingly permit the deflectable web portion 36 to deflect about a generally vertical axis, flexing centrally in substantially two dimensions like a folded strip, when contact pressure developed at the seating surfaces 14 of the pressure retaining plates 12 forces them to be relatively displaced towards each other in a direction substantially parallel to the fluid flow direction 21. Accordingly, the middle deflectable web portion 36 provides the flexibility for the flexible wedge 10, such that any changes in pressure, temperature and/or external forces can be accommodated while limiting distortion of the pressure retaining plates. As bending stresses are principally confined within the deflectable web portion 36, a better seal is provided between the seating surfaces 14 of the flexible wedge 10 and the corresponding valve seats of the valve body.

In one example of the first embodiment of the present invention, the gate valve flexible wedge 10 comprises the following approximate dimensions, provided for illustrative purposes only:

overall diameter of wedge: 10.75";
overall axial width of wedge at outer end 25: 7.35";
wedge angle θ: 10°;
width of each slot 30: 0.25";
depth of each slot 30 (from transverse faces 18): 6.00";
axial width of deflectable web portion 36 (between offset slots 30): 1.31"; and
transverse length of central wedge body: 8.24".

Figure 4A:
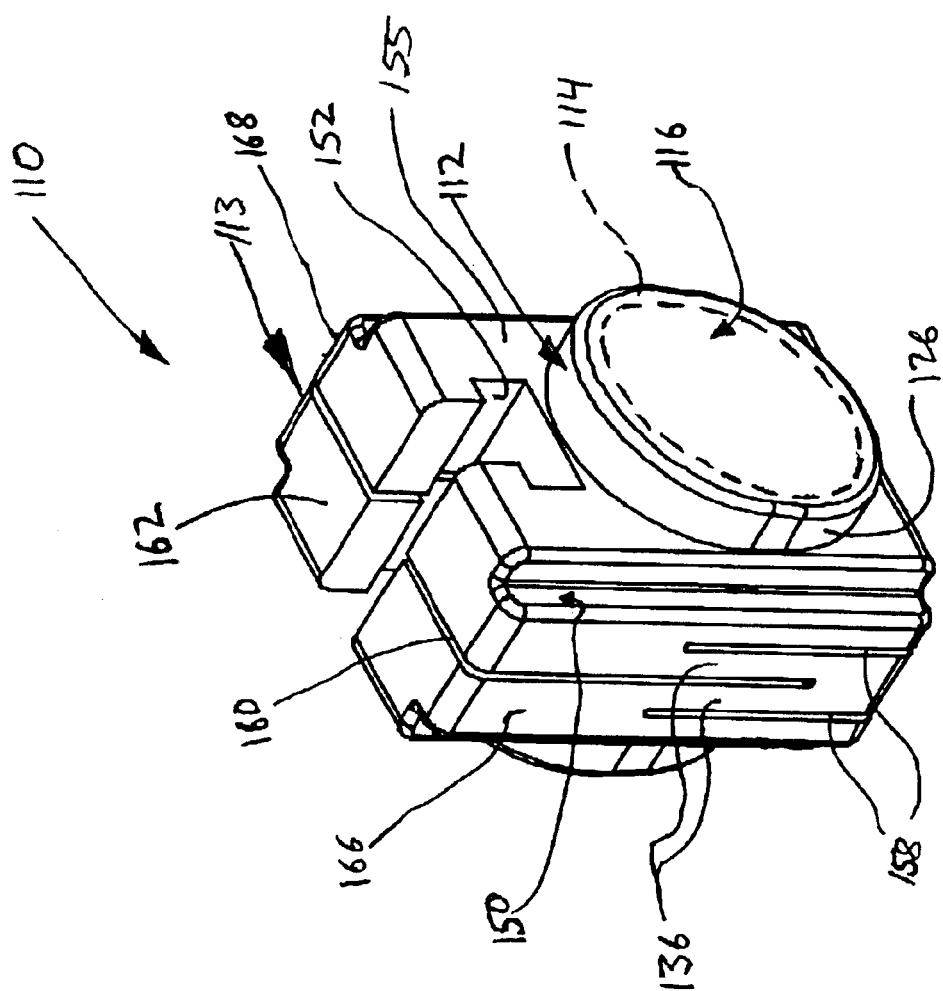
FIG. 4a is a perspective view of a flexible wedge for a gate valve in accordance with a second embodiment of the present invention.
Figure 4C:
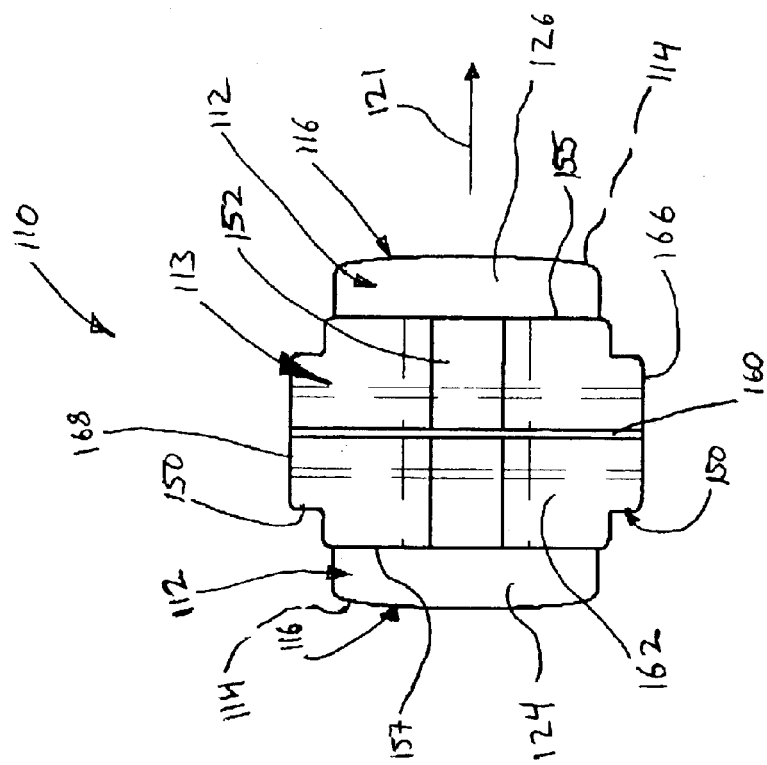
Figure 4B:
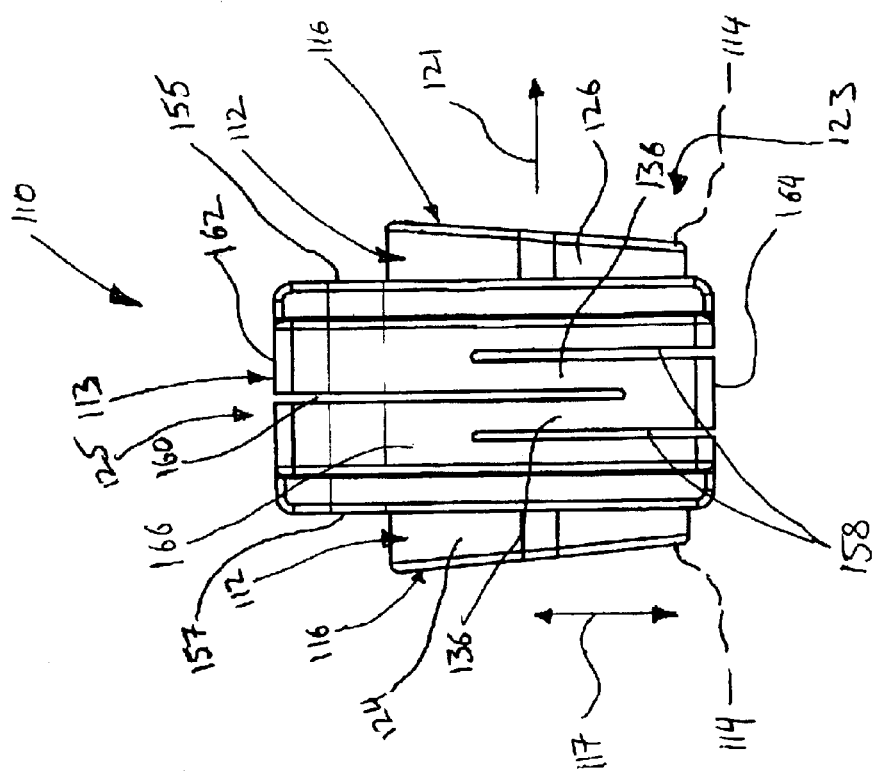

Referring now to a flexible wedge 110 in accordance with a second embodiment of the present invention which is shown in FIGS. 4a to 4c, the flexible wedge 110, which can also be used within gate valve 80 of FIG. 2, comprises generally a pair of pressure retaining plates 112, particularly an upstream pressure retaining plate 124 and a downstream pressure retaining plate 126, which are integrally linked by a larger central wedge body 113 therebetween. In contrast to the first embodiment of the present invention depicted in FIGS. 3a to 3c, the pressure retaining plates 112 are smaller than the central wedge body 113 and generally have an oval shape. The pressure retaining plates 112 nonetheless comprise planar outer faces 116 for obstructing fluid flow through the valve body when the flexible wedge 110 is in the closed position, the annular edges of which provide the seating surfaces 114 for sealing engagement with corresponding valve seats in the valve body. As described above relative to the first embodiment of the present invention, the seating surfaces 114, and therefore the outer faces 116 in this case, are slightly inclined away from a vertical axis, converging toward at an inner end 123 of the flexible wedge 110. Mating valve seats in the valve body are cooperatively inclined and outwardly divergent such that the parallel seating surfaces 114 of the flexible wedge 110 can abut thereagainst to form a tight seal. The relatively narrow angled wedge shape formed enables a stem force applied to the outer end 125 of the flexible wedge 110 to translate into a larger normal force at the seating faces, thereby ensuring a tight seal therebetween.

The downstream pressure retaining plate 126 axially outwardly projects from the downstream face 155 of the central wedge body 113, and the upstream pressure retaining plate 124 outwardly projects in an opposed direction from the upstream face 157 of the central wedge body 113. The central wedge body 113 comprises a T-shaped stem engagement slot 152 at an outer end 125 thereof, the stem engagement slot 152 being axially aligned relative to a direction of fluid flow 121. Wedge guide tabs 150 laterally project out from the central wedge body 113, and are adapted for engagement within corresponding guide slots defined within the valve body. The wedge guide tabs 150 accordingly act to maintain the flexible wedge 110 upright when translated within the valve body between an open and a closed position of the valve.

The central wedge body 113 generally has a rectangular cross-sectional shape, and defines an outer, or upper, surface 162 and an opposed inner, or bottom, surface 164. The central wedge body 113 of the flexible wedge 110 includes three offset slots therein. Particularly, first and second axially spaced apart lower slots 158 extend upwardly from the bottom surface 164 into the central wedge body 113 an equal depth, and a third upper slot 160 extends inwardly from the opposed upper surface 162 and is axially located between the first and second lower slots 158. The third slot 160 extend within the central wedge body a greater depth that the first and second slots 158. All three slots are therefore parallel to, but offset from, one another and extend only partially into the central wedge body 113 in their depth-wise directions, namely in planes perpendicular to a fluid flow direction 121 from upper and lower surfaces 162 and 164 thereof, while overlapping in this depth-wise direction to define two parallel deflectable web portions 136 therebetween. All three slots transversely extend completely through the central wedge body 113 between a first lateral surface 166 and a second opposed lateral surface 168 defined on the laterally projecting guide tabs 150 of the central wedge body 113.

As described above relative to the first embodiment, the number, depth, width and profile of the slots in the central wedge body 113 can be varied and selected to provide a desired level of stiffness for the flexible wedge 110. The offset and overlapping slots 158 and 160 also create a "folded topology" in the central wedge body 113 of the flexible wedge 110 which provides improved flexibility, however the folds are generally horizontally, or laterally, extending in contrast to the generally vertically extending folds of the central wedge body 13 of the flexible wedge 10. The same results are nonetheless achieved, namely that the deflectable web portions 136 can deflect to provide the flexibility for the flexible wedge 110, such that any changes in pressure, temperature and/or external forces can be accommodated while limiting distortion of the pressure retaining plates 112. This therefore ensures that a tight seal is maintained between the seating surfaces 114 of the flexible wedge 110 and the corresponding valve seats in the valve body.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

What is claimed is:

1. A flexible wedge for a gate valve, adapted for being linearly displaced by a valve stem along a longitudinal stem axis within a gate valve body, the flexible wedge being displaceable between an open position and a closed position, said flexible wedge comprising:
    a pair of pressure retaining plates having inclined seating surfaces on outer faces thereof for mating with corresponding valve seats within said valve body to prevent fluid flow therethrough when said gate valve wedge is in said closed position; and
    a central wedge body disposed between and linking said pressure retaining plates, said central wedge body defining two offset slots extending partially into said central wedge body from opposed edges thereof and overlapping in a depth-wise direction to define a deflectable web portion between said offset slots, said slots being asymmetrical relative to transversely extending plane bisecting the flexible wedge and defining said longitudinal stem axis therein.

2. The flexible wedge as defined in claim 1, wherein said offset slots extend only partially into said central wedge body in a first lateral direction perpendicular to said longitudinal stem axis and extend completely therethrough in a second axial direction substantially parallel to said longitudinal stem axis.

3. The flexible wedge as defined in claim 1, wherein said offset slots are parallel to each other and to said transversely extending plane.

4. The flexible wedge as defined in claim 3, wherein said offset slots define transversely extending planes substantially perpendicular to a direction of fluid flow through said valve body and spaced apart in said direction of fluid flow.

5. The flexible wedge as defined in claim 2, wherein said opposed edges of said central wedge body are lateral edges.

6. The flexible wedge as defined in claim 5, wherein said offset slots define a folded central wedge body having first and second opposed edges extending in a direction parallel to said longitudinal stem axis, said first edge being engaged with one of said pressure retaining plates and said second edge being engaged with the other of said pressure retaining plates.

7. The flexible wedge as defined in claim 1, wherein said opposed edges of said central wedge body are upper and lower edges thereof.

8. The flexible wedge as defined in claim 7, wherein said offset slots define a folded central wedge body having first and second opposed edges both extending in a direction perpendicular to stem travel and substantially transverse to a direction of fluid flow through said valve body, said first edge being engaged with one of said pressure retaining plates and said second edge being engaged to the other of said pressure retaining plates.

9. The flexible wedge as defined in claim 1, wherein said offset slots are of equal depth.

10. The flexible wedge as defined in claim 1, wherein said central wedge body integrally links said pressure retaining plates.

11. A gate valve comprising:
    a valve body defining a fluid flow passage therethrough and a valve wedge chamber, said valve having inclined annular valve seats at an intersection of said fluid flow passage and said valve wedge chamber;
    a flexible wedge gate comprising upstream and downstream pressure retaining plates each having an inclined seating surface on an outer face thereof, said wedge gate being disposed within said valve body for closing said fluid flow passage and being linearly displaceable along a first axis within said valve wedge chamber between an open position and a closed position wherein said seating surfaces mate with said annular valve seats of said valve body to form a seal therebetween preventing fluid flow through said valve body;
    said wedge gate having a central wedge body disposed between and linking said upstream and downstream pressure retaining plates, in said central wedge body defining two offset slots extending partially into said central wedge body from opposed edges thereof and overlapping in a depth-wise direction to define a deflectable web portion between said offset slots said slots being asymmetrical relative to a central transversley extending plane bisecting the wedge gate and defining said first axis therein; and
    a valve stem engaged at a first end thereof to said wedge and extending outwardly from said valve body, said valve stem being actuable to linearly displace said wedge gate along said first axis between said open position and said closed position.

12. The flexible wedge as defined in claim 11, wherein said offset slots defined within said central wedge body extend only partially into said central wedge body in a lateral direction perpendicular to said first axis and extend completely therethrough in an axial direction substantially parallel to said first axis.

13. The gate valve as defined in claim 11, wherein said offset slots in said central wedge body are parallel to each other and to said central transversely extending plane.

14. The gate valve as defined in claim 13, wherein said offset slots define transversely extending planes substantially perpendicular to a direction of fluid flow through said fluid flow passage and spaced apart in said direction of fluid flow.

15. The gate valve as defined in claim 11, wherein said offset slots are of equal depth.

16. The gate valve as defined in claim 14, wherein the transversely extending planes defined by said offset slots are disposed on opposite sides of said central transversely extending plane.

17. A flexible wedge for a gate valve, adapted for being linearly displaced by a valve stem along a longitudinal stem axis within a gate valve body, the flexible wedge being displaceable between an open positon and a closed position, said flexible wedge comprising:
   a pair of pressure retaining plates having inclined seating surfaces on outer faces thereof for missing with corresponding valve seats within said valve body to prevent fluid flow therethrough when said gate valve wedge is in said closed position; and
   a central wedge body disposed between and linking said pressure retaining plates, said central wedge body defining at least two offset slots extending partially into said central wedge body from opposed edges thereof and overlapping in a depth-wised direction to define a deflectable web portion between said offset slots, said slots being parallel to each other and to a tranversely extending plane bisecting the flexible wedge and defining said longitudinally stem axis therein.

18. The flexible wedge as defined in claim 17, wherein said slots are asymmetrical relative to said transversely extending plane.

19. The flexible wedge as defined in claim 17, wherein said slots extend only partially into said central wedge body in a first lateral direction perpendicular to said longitudinal stem axis and extend completely therethrough in a second axial direction substantially parallel to said longitudinal stem axis.

20. A flexible wedge for a gate valve, adapted for being linearly displaced by a valve stem along a longitudinal stem axis within a gate valve body, the flexible wedge being displaceable between an open position and a closed position, said flexible wedge comprising:
   a pair of pressure retaining plates having inclined seating surfaces on outer faces thereof for mating with corresponding valve seat within said valve body to prevent fluid flow therethrough when said gate valve wedge is in said closed postion; and
   a central wedge body disposed between and linking said pressure retaining plates, and central wedge body defining two offset slots extending only partially into said central wedge body in a lateral direction from opposed lateral edges thereof and overlapping in a depth-wise direction to define a deflectable web portion between said offset slots, and offset slots extending completely through said central wedge body in an axial direction substantially parallel to said longitudinal stem axis and substantially normal to said lateral direction.

21. The flexible wedge as defined in claim 20, wherein said slots are parallel to each other and to a transversely extending plane bisecting the flexible wedge and defining said longitudinal stem axis therein.

22. The flexible wedge as defined in claim 21, wherein said slots are asymmetrical relative to said transversely extending plane.

* * * * *